US008682069B2

(12) United States Patent
Hizume et al.

(10) Patent No.: US 8,682,069 B2
(45) Date of Patent: Mar. 25, 2014

(54) IMAGE SIGNAL PROCESSING APPARATUS, IMAGE SIGNAL PROCESSING METHOD, AND PROGRAM

(75) Inventors: Tarou Hizume, Ishikawa (JP); Toshiyuki Sano, Fukuoka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/392,763

(22) PCT Filed: Oct. 26, 2011

(86) PCT No.: PCT/JP2011/005954

§ 371 (c)(1), (2), (4) Date: Feb. 27, 2012

(87) PCT Pub. No.: WO2012/056684

PCT Pub. Date: May 3, 2012

(65) Prior Publication Data

US 2012/0169904 A1 Jul. 5, 2012

(30) Foreign Application Priority Data

Oct. 26, 2010 (JP) ................................. 2010-239523

(51) Int. Cl.
*G06K 9/00* (2006.01)

(52) U.S. Cl.
USPC ........... 382/167; 382/275; 382/300; 348/538; 348/806

(58) Field of Classification Search
USPC ................... 382/167, 275, 300; 348/538, 806
See application file for complete search history.

(56) References Cited

U.S. PATENT DOCUMENTS

| | | | | |
|---|---|---|---|---|
| 4,941,037 | A * | 7/1990 | Sasaki et al. | 358/517 |
| 5,126,832 | A * | 6/1992 | Lee et al. | 348/589 |
| 5,382,976 | A * | 1/1995 | Hibbard | 348/273 |
| 5,422,738 | A * | 6/1995 | Ishihara et al. | 358/500 |
| 5,452,018 | A * | 9/1995 | Capitant et al. | 348/651 |
| 5,474,494 | A * | 12/1995 | Sims | 452/194 |
| 6,388,706 | B1 * | 5/2002 | Takizawa et al. | 348/273 |
| 6,593,964 | B1 * | 7/2003 | Sakurai | 348/279 |
| 6,924,819 | B2 * | 8/2005 | Nishida et al. | 345/604 |
| 7,009,734 | B2 * | 3/2006 | Suwa et al. | 358/1.9 |

(Continued)

FOREIGN PATENT DOCUMENTS

| | | |
|---|---|---|
| JP | 7-095595 | 4/1995 |
| JP | 2008-301395 | 12/2008 |

(Continued)

*Primary Examiner* — Jayesh A Patel

(74) *Attorney, Agent, or Firm* — Greenblum & Bernstein, P.L.C.

(57) ABSTRACT

An image signal processing apparatus includes: a color-data generator that generates color data of a correction coordinate point by interpolating color data of pixels in the same color line above and below the correction coordinate point; a first luminance generator that generates first luminance data of the correction coordinate point by interpolating the luminance data of the pixels in the same color line above and below the correction coordinate point; a second luminance generator that generates second luminance data of the correction coordinate point by interpolating the luminance data of the pixels above and below the correction coordinate point; and a complementary-color-data generator that generates the complementary-color data of the correction coordinate point based on the generated color data, the first luminance data, and the second luminance data.

5 Claims, 12 Drawing Sheets

(56) References Cited

U.S. PATENT DOCUMENTS

| | | | | |
|---|---|---|---|---|
| 7,061,528 | B1 * | 6/2006 | Honma | 348/222.1 |
| 7,065,246 | B2 * | 6/2006 | Xiaomang et al. | 382/162 |
| 7,116,819 | B2 * | 10/2006 | Zhang | 382/162 |
| 7,595,825 | B2 * | 9/2009 | Tsuruoka | 348/241 |
| 7,796,814 | B2 * | 9/2010 | Sato et al. | 382/167 |
| 7,880,772 | B2 * | 2/2011 | Nagano et al. | 348/223.1 |
| 8,135,213 | B2 * | 3/2012 | Tanaka et al. | 382/167 |
| 2003/0193579 | A1 * | 10/2003 | Mori et al. | 348/222.1 |
| 2009/0115869 | A1 * | 5/2009 | Ojima et al. | 348/223.1 |

FOREIGN PATENT DOCUMENTS

| | | | | |
|---|---|---|---|---|
| JP | 2008301395 | * | 12/2008 | H04N 5/232 |
| JP | 2009-005232 | | 1/2009 | |
| JP | 2009005232 | * | 1/2009 | H04N 9/07 |
| JP | 2009-157733 | | 7/2009 | |

* cited by examiner (a) PRE-CORRECTED IMAGE (b) IDEAL DISTORTION-CORRECTED IMAGE (c) LINEAR INTERPOLATION FOR EACH SAME COLOR PLANE OF INTERLACE DATA (a)

(b)

(a) (b) (c)

(a)

BiCubic(a=-1)

(b)

BiCubic(a=-0.5)

(c)

B-Spline (d)

BiLinear

PRIOR ART

IMAGE SIGNAL PROCESSING APPARATUS, IMAGE SIGNAL PROCESSING METHOD, AND PROGRAM

TECHNICAL FIELD

The present invention relates to an apparatus that performs image signal processing and, in particular, to an image signal processing apparatus that corrects distortion in image data obtained from a single-chip color image pickup device of a complementary-color-field color-difference sequential system.

BACKGROUND ART

With the increased image quality and reduced cost, monitoring cameras are now in use on many occasions. For example, monitoring cameras are used not only indoors for monitoring banks, convenience stores, and pachinko parlors but also outdoors for monitoring stations, roads, rivers, and dams. It is expected that the application fields of monitoring cameras will be broaden in the future.

The cost of monitoring cameras has greatly reduced. However, the installation of an unlimited number of monitoring cameras is not practical. In consideration of cost-effectiveness, desired image quality, etc., it is requested to cover as a wide monitoring area as possible with a limited number of cameras. When panning and tilting bases are not used, wide-viewing-angle lenses would be required.

In general, wide-viewing-angle lenses cause images to be distorted into barrel shapes. Distorted images are greatly different from landscapes actually seen by the human eyes. For example, in a distorted image, straight lines are not reflected as they are, and the size of an object is made different between the center and end of a screen. Thus, the distorted image gives a strong sense of discomfort, which influences the degree of fatigue of a person who monitors the camera image. Therefore, it is desired that such distortion be corrected.

Expensive lenses correct aberration such as distortion with their high refractive indexes, aspherical surfaces, and large number of groups (per lens). However, it is difficult to use such expensive lenses for monitoring in view of cost. Thus, distortion correction processing based on signal processing is required.

As a conventional image signal processing apparatus that corrects distortion, an apparatus illustrated in, e.g., Patent Literature 1 is known. FIG. 12 is a block diagram of the image signal processing apparatus illustrated in the official gazette. The image signal processing apparatus has: a coordinate conversion unit 102 that calculates, from the position of a pixel of a color image, a corresponding sampling coordinate on a color mosaic image corresponding to the position of the pixel of the color image having been subjected to deformation processing; a sampling unit 104 that interpolates and generates the value of a pixel at the sampling coordinate for each of a plurality of color planes obtained by decomposing the color mosaic image; and a color generation unit 106 that combines the interpolation values of the respective color planes with each other to generate the color image. The image signal processing apparatus finds, from a color mosaic image, the value of each pixel of a color image having been subjected to deformation processing as the value of a pixel at a sampling coordinate by interpolation calculation. Thus, with single interpolation calculation, the image signal processing apparatus is allowed to implement both color interpolation processing that generates a color image from a color mosaic image and the deformation processing of the color image.

In the image signal processing apparatus described above, a color filter array having complementary-color arrangement may be used. However, in a case where data of a complementary-color-field color-difference sequential system is to be processed by the image signal processing apparatus, coordinate conversion for each color plane by linear interpolation causes resolution to be seriously degraded. In particular, horizontal resolution is likely to be degraded by interpolation in a horizontal direction before luminance data is generated.

As for a vertical direction, interlace data is processed by the image signal processing apparatus for each color filter plane. More specifically, since linear interpolation is performed for each interlaced scanning data, the loopback of a frequency component in the vertical direction is likely to occur, which causes an image to be degraded.

CITATION LIST

Patent Literature

[Patent Literature 1]
Japanese Patent Laid-Open No. 2009-005232

SUMMARY OF INVENTION

Technical Problem

The present invention has been made under the circumstances described above. It is an object of the present invention to provide an image processing apparatus that can properly correct distortion in a signal image of a complementary-color-field color-difference sequential system.

Solution to Problem

According to one aspect of the present invention, there is provided an image signal processing apparatus. The image signal processing apparatus includes: a frame memory that stores image data of a complementary-color-field color-difference sequential system; an address generation unit that generates, based on previously-provided distortion information, an address indicating the respective position on the frame memory corresponding to a position of each pixel in a screen to be displayed; a color-data generation unit that generates color data of a point specified by the address by interpolating other color data of pixels, the pixels being in a same column included in a predetermined number of lines located above and below the point and having the same color line as a color line to be generated by interpolation; a color-data-related luminance-data generation unit that generates first luminance data of the point specified by the address by interpolating luminance data of the pixels, the pixels being in the same column included in the predetermined number of lines located above and below the point and having the same color line as the color line to be generated by the interpolation; a luminance-based-data generation unit that generates second luminance data of the point specified by the address by interpolating the luminance data of the pixels, the pixels being in the same column included in the predetermined number of lines located above and below the point; and a complementary-color-data generation unit that generates complementary-color data of the point specified by the address based on the color data, the first luminance data, and the second luminance data.

According to another aspect of the present invention, there is provided an image signal processing method. The image signal processing method includes: a step of storing image data of a complementary-color-field color-difference sequential system in a frame memory; a step of generating, based on previously-provided distortion information, an address indicating the respective position on the frame memory corresponding to a position of each pixel in a screen to be displayed; a step of generating color data of a point specified by the address by interpolating other color data of pixels, the pixels being in a same column included in a predetermined number of lines located above and below the point and having the same color line as a color line to be generated by interpolation; a step of generating first luminance data of the point specified by the address by interpolating luminance data of the pixels, the pixels being in the same column included in the predetermined number of lines located above and below the point and having the same color line as the color line to be generated by the interpolation; a step of generating second luminance data of the point specified by the address by interpolating the luminance data of the pixels, the pixels being in the same column included in the predetermined number of lines located above and below the point; and a step of generating complementary-color data of the point specified by the address based on the color data, the first luminance data, and the second luminance data.

According to another aspect of the present invention, there is provided a program for correcting distortion in image data of a complementary-color-field color-difference sequential system. The program causes a computer to execute: a step of storing the image data in a frame memory; a step of generating, based on previously-provided distortion information, an address indicating the respective position on the frame memory corresponding to a position of each pixel in a screen to be displayed; a step of generating color data of a point specified by the address by interpolating other color data of pixels, the pixels being in a same column included in a predetermined number of lines located above and below the point and having the same color line as a color line to be generated by interpolation; a step of generating first luminance data of the point specified by the address by interpolating luminance data of the pixels, the pixels being in the same column included in the predetermined number of lines located above and below the point and having the same color line as the color line to be generated by the interpolation; a step of generating second luminance data of the point specified by the address by interpolating the luminance data of the pixels, the pixels being in the same column included in the predetermined number of lines located above and below the point; and a step of generating complementary-color data of the point specified by the address based on the color data, the first luminance data, and the second luminance data.

As described below, the present invention has other aspects. Accordingly, the disclosure of the present invention is intended to provide some aspects of the present invention but not intended to limit the scope of the invention described and claimed herein.

BRIEF DESCRIPTION OF DRAWINGS

FIG. 1 is a block diagram illustrating an image signal processing apparatus according to an embodiment of the present invention.

FIG. 2 is a diagram illustrating camera-signal processing by the image signal processing apparatus according to the embodiment of the present invention.

FIG. 4 is a diagram illustrating the data strings of the complementary-color-field color-difference sequential system and correction coordinate points.

FIG. 5 is a diagram illustrating a difference in the position of an optical center in a vertical direction between the fields.

FIG. 6 is a diagram illustrating the data strings of the complementary-color-field color-difference sequential system and the correction coordinate point (in detail).

FIG. 8 is a diagram illustrating an overview of interpolation processing.

[FIG. 9(a) to FIG. 9(*b*)] FIG. 9(*a*) is a diagram illustrating an example where color data is not degraded when luminance data is generated, and FIG. 9(*b*) is a diagram illustrating an example where color data is degraded when luminance data is generated.

FIG. 12 is a diagram illustrating an example of a conventional image signal processing apparatus.

DESCRIPTION OF EMBODIMENT

Figure 1:
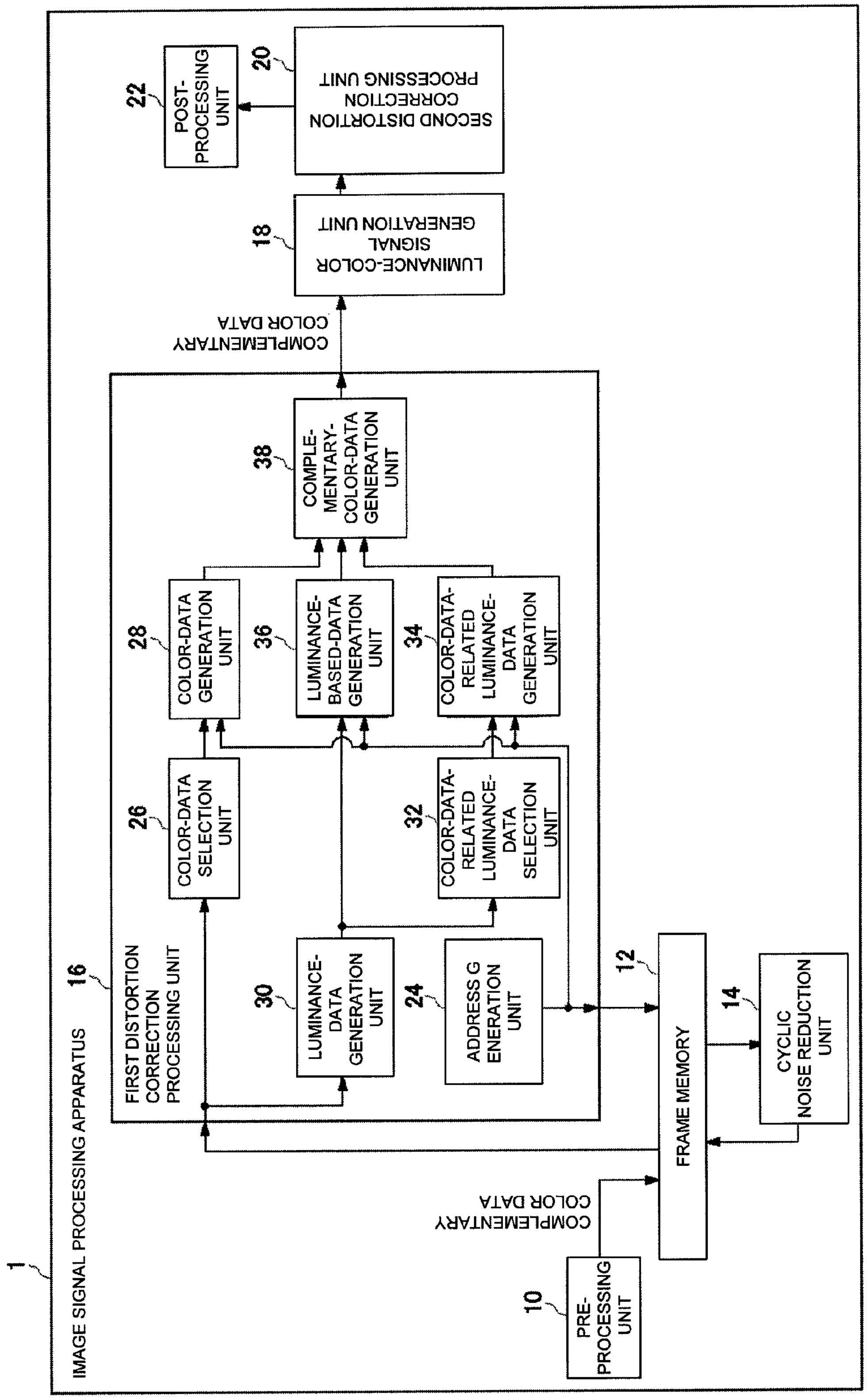
[FIG. 1]

The present invention will be described in detail below. Note, however, that the present invention is not limited to a detailed description given below and the accompanying drawings.

An image signal processing apparatus according to the present invention includes: a frame memory that stores image data of a complementary-color-field color-difference sequential system; an address generation unit that generates, based on previously-provided distortion information, an address indicating the respective position on the frame memory corresponding to a position of each pixel in a screen to be displayed; a color-data generation unit that generates color data of a point specified by the address by interpolating other color data of pixels, the pixels being in a same column included in a predetermined number of lines located above and below the point and having the same color line as a color line to be generated by interpolation; a color-data-related luminance-data generation unit that generates first luminance data of the point specified by the address by interpolating luminance data of the pixels, the pixels being in the same column included in the predetermined number of lines located above and below the point and having the same color line as the color line to be generated by the interpolation; a luminance-based-data generation unit that generates second luminance data of the point specified by the address by interpolating the luminance data of the pixels, the pixels being in the same column included in the predetermined number of lines located above and below the point; and a complementary-color-data generation unit that generates complementary-color data of the point specified by the address based on the color data, the first luminance data, and the second luminance data.

With this configuration, complementary-color data is generated based on color data having a distant spatial phase, color-data-related first luminance data, and second luminance data having a close spatial phase when distortion in the vertical direction of a signal image of the complementary-color-field color-difference sequential system is corrected. Thus, a color image signal of the complementary-color-field color-difference sequential system with satisfactory image quality can be obtained.

The image signal processing apparatus according to the present invention may include: a luminance-color-signal generation unit that generates a luminance-color signal based on the complementary-color data generated by the complementary-color-data generation unit; and a correction processing unit that corrects distortion in a horizontal direction of the luminance-color signal generated by the luminance-color-signal generation unit.

With this configuration, distortion correction processing in the horizontal direction can be configured so as not to use the frame memory.

An image signal processing method according to the present invention includes: a step of storing image data of a complementary-color-field color-difference sequential system in a frame memory; a step of generating, based on previously-provided distortion information, an address indicating the respective position on the frame memory corresponding to a position of each pixel in a screen to be displayed; a step of generating color data of a point specified by the address by interpolating other color data of pixels, the pixels being in a same column included in a predetermined number of lines located above and below the point and having the same color line as a color line to be generated by interpolation; a step of generating first luminance data of the point specified by the address by interpolating luminance data of the pixels, the pixels being in the same column included in the predetermined number of lines located above and below the point and having the same color line as the color line to be generated by the interpolation; a step of generating second luminance data of the point specified by the address by interpolating the luminance data of the pixels, the pixels being in the same column included in the predetermined number of lines located above and below the point; and a step of generating complementary-color data of the point specified by the address based on the color data, the first luminance data, and the second luminance data. Note that the program of the present invention causes a computer to execute each step of the image signal processing method.

According to the present invention, complementary-color data is generated based on color data having a distant spatial phase, color-data-related first luminance data, and second luminance data having a close spatial phase when distortion in the vertical direction of a signal image of the complementary-color-field color-difference sequential system is corrected. Thus, the present invention has an excellent effect in that a color signal image of the complementary-color-field color-difference sequential system with satisfactory image quality can be obtained.

[Embodiment]

The image signal processing apparatus according to an embodiment of the present invention will be described below with reference to the drawings.

FIG. 1 is a diagram illustrating the image signal processing apparatus 1 according to the embodiment of the present invention. The image signal processing apparatus 1 has: a frame memory 12 that stores an image signal; a pre-processing unit 10 that applies pre-processing to an image signal to be stored in the frame memory 12; a cyclic noise reduction unit 14 that applies cyclic noise reduction to an image signal stored in the frame memory 12; a first distortion correction processing unit (hereinafter referred to as a "first correction processing unit") 16 that corrects distortion in the vertical direction of an image signal stored in the frame memory 12; a luminance-color-signal generation unit 18 that generates a luminance-color signal from a corrected image signal; a second distortion correction processing unit (hereinafter referred to as a "second correction processing unit") 20 that corrects distortion in the horizontal direction of a luminance-color signal; and a post-processing unit 22 that applies post-processing to a corrected luminance-color signal.

The first correction processing unit 16 has an address generation unit 24 that generates, based on previously-provided distortion information, an address indicating the respective position on the frame memory corresponding to the position of each pixel in a screen to be displayed. The screen is displayed based on the complementary-color data of a point specified by the address, whereby distortion in a vertical direction is corrected. Therefore, the point specified by the address will be called a "correction coordinate point" below.

The image signal processing apparatus 1 has information on distortion amounts. As the distortion amounts, curved lines and broken lines can be used to express actual image heights relative to ideal image heights. Distortion with a viewing angle of 90 degrees or less can be relatively satisfactorily approximated according to about a several-order polynomial. For example, the image signal processing apparatus 1 has the information on the distortion amounts in a polynomial form.

Figure 4:
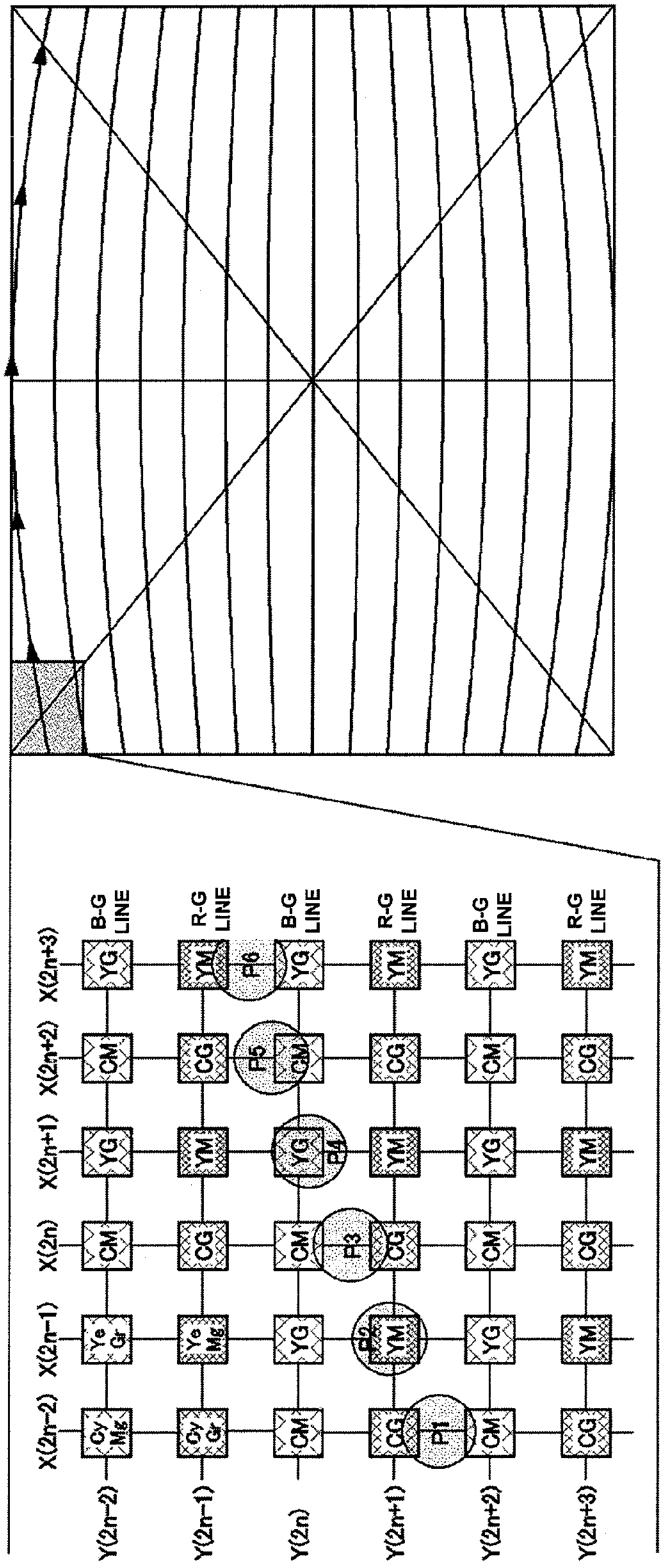
[FIG. 4]

FIG. 4 is a diagram illustrating the correction coordinate points. On the right side of FIG. 4, the overall view of an image is illustrated. In this view, distorted transverse lines indicate that straight lines in an actual space are reflected in a distorted manner. With distortion correction processing, the distorted transverse lines are so corrected as to be the straight lines.

Specifically, the address generation unit 24 specifies the distorted transverse lines based on the distortion amounts. By generating addresses on the frame memory 12 such that zoom magnification in a vertical direction is raised with distance from the position of the optical center of the image, the address generation unit 24 can express the distorted transverse lines. For example, it is only necessary to set a coefficient for adjusting a distortion correction amount to the coefficient of a polynomial indicating the number of pixels from the position of the optical center of the image and the distortion amount. Then, the first correction processing unit 16 reads complementary-color data on the transverse lines and displays the read data on the same lines, so that the distortion can be corrected.

On the left side of FIG. 4, the enlarged view of an upper left region in the overall view on the right side is illustrated. As illustrated in the view, the correction coordinate points P1 to P6 are generated at positions at which the distorted lines and the columns of the pixels intersect with each other. The first correction processing unit 16 reads the complementary-color data of the correction coordinate points. However, it is clear from FIG. 4 that the correction coordinate points P1 to P6 do not necessarily match the positions of the pixels on the frame memory 12. Therefore, as for the correction coordinate points that do not match the positions of the pixels on the frame memory 12, it is necessary to interpolate the data of neighboring pixels to generate the complementary-color data of the correction coordinate points.

The first correction processing unit 16 has, as configurations for performing the interpolation of the values of the pixels, a color-data selection unit 26, a color-data generation unit 28, a luminance-data generation unit 30, a color-data-related luminance-data selection unit 32, a color-data-related luminance-data generation unit 34, a luminance-based-data generation unit 36, and a complementary-color-data generation unit 38. According to the embodiment, the complementary-color-data generation unit 38 generates complementary-color data whose distortion in the vertical direction is corrected, based on color data generated by the color-data generation unit 28, color-data-related luminance-data generated by the color-data-related luminance-data generation unit 34, and luminance-based data generated by the luminance-based-data generation unit 36. Next, the respective configurations of the first correction processing unit 16 will be described.

The color-data selection unit 26 selects lines having desired color data from upper and lower lines and inputs information specifying the selected lines to the color-data generation unit 28. The color-data generation unit 28 performs the interpolation processing of color data based on a positional relationship between a correction coordinate point generated by the address generation unit 24 and pixels above and below the correction coordinate point. The color-data generation unit 28 inputs the interpolated color data to the complementary-color-data generation unit 38.

The luminance-data generation unit 30 generates luminance data from image data read from the frame memory 12 and inputs the generated luminance data to the color-related luminance-data selection unit 32 and the luminance-based-data generation unit 36. The color-data-related luminance-data selection unit 32 selects the luminance data of pixels related to desired color data from the input luminance data and inputs the selected luminance data to the color-data-related luminance-data generation unit 34. The color-data-related luminance-data generation unit 34 performs the interpolation processing of the color-data-related luminance data based on the positional relationship between the correction coordinate point generated by the address generation unit 24 and the pixels above and below the correction coordinate point. The color-data-related luminance-data generation unit 34 inputs the interpolated luminance data to the complementary-color-data generation unit 38. The luminance data generated here is equivalent to "first luminance data" in claims.

The luminance-based-data generation unit 36 performs the interpolation processing of luminance data based on the positional relationship between the correction coordinate point generated by the address generation unit 24 and the pixels above and below the correction coordinate point. The luminance-based-data generation unit 36 inputs the interpolated luminance data to the complementary-color-data generation unit 38. The luminance data generated here is equivalent to "second luminance data" in the claims.

The complementary-color-data generation unit 38 generates complementary-color data whose distortion in the vertical direction is corrected, based on the color data input from the color-data generation unit 28, the luminance data (first luminance data) input from the color-data-related luminance-data generation unit 34, and the luminance data (second luminance data) input from the luminance-based-data generation unit 36.

Figure 2:
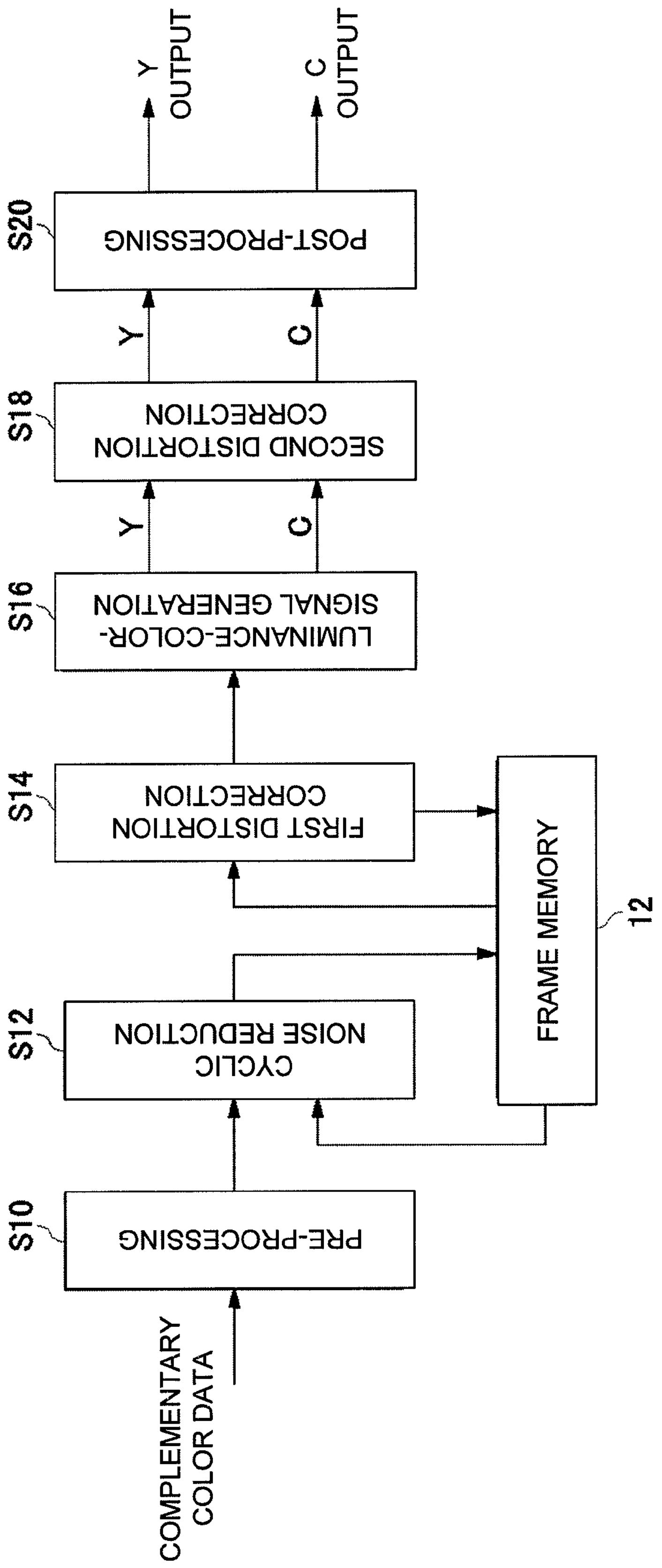
[FIG. 2]

FIG. 2 is a diagram illustrating the operations of camera-signal processing by the image signal processing apparatus 1 according to the embodiment of the present invention. The operations by the image signal processing apparatus 1 will be described with reference to FIG. 2. The image signal processing apparatus 1 applies the pre-processing to a color image signal of a complementary-color-field color-difference sequential system (S10). Here, it is assumed that the image signal is digitized. Image data may be obtained from an image pickup device, or data stored in a storage device may be input. As the pre-processing (S10), gain addition, optical-black adjustment, etc., are performed. Next, the image signal processing apparatus 1 stores the image signal having been subjected to the pre-processing in the frame memory 12.

Next, the image signal processing apparatus 1 performs, as the camera-signal processing using the frame memory 12, frame-cyclic noise reduction processing (S12), electronic zooming, vertical inversion, image update stop (freeze), etc. Here, the frame-cyclic noise reduction processing (S12) refers to processing in which an infinite impulse response filter in a time direction is formed using the frame memory 12. The frame-cyclic noise reduction processing (S12) has high noise-reduction performance. Therefore, there are many cases in which the frame memory 12 is installed in the image signal processing apparatus 1.

Next, the image signal processing apparatus 1 applies first distortion correction processing (hereinafter referred to as "first correction processing") to the image signal stored in the frame memory 12. The first correction processing refers to processing in which distortion in the vertical direction is corrected. The first correction processing will be described in detail below with also reference to FIG. 1.

When complementary-color image data stored in the frame memory 12 is of the field color-difference sequential system, R-G lines and B-G lines alternately appear on a line-by-line basis. In the case of a normal reading access to the frame memory 12 without distortion correction, etc., the R-G lines and the B-G lines are alternately read by raster scanning on a line-by-line basis and input to the luminance-color-signal generation unit 18. The luminance-color-signal generation unit 18 generates a luminance-color signal from complementary-color data by the switching of color generation processing for each of the R-G lines and the B-G lines, etc. When distortion in the vertical direction is corrected, data of any line is read along the distortion to generate data capable of being processed by the luminance-color-signal generation unit 18. Here, a correspondence relationship between a complementary-color-data line and an RGB line will be described with reference to FIG. 3(*a*) to FIG. 3(*c*).

Figure 3:
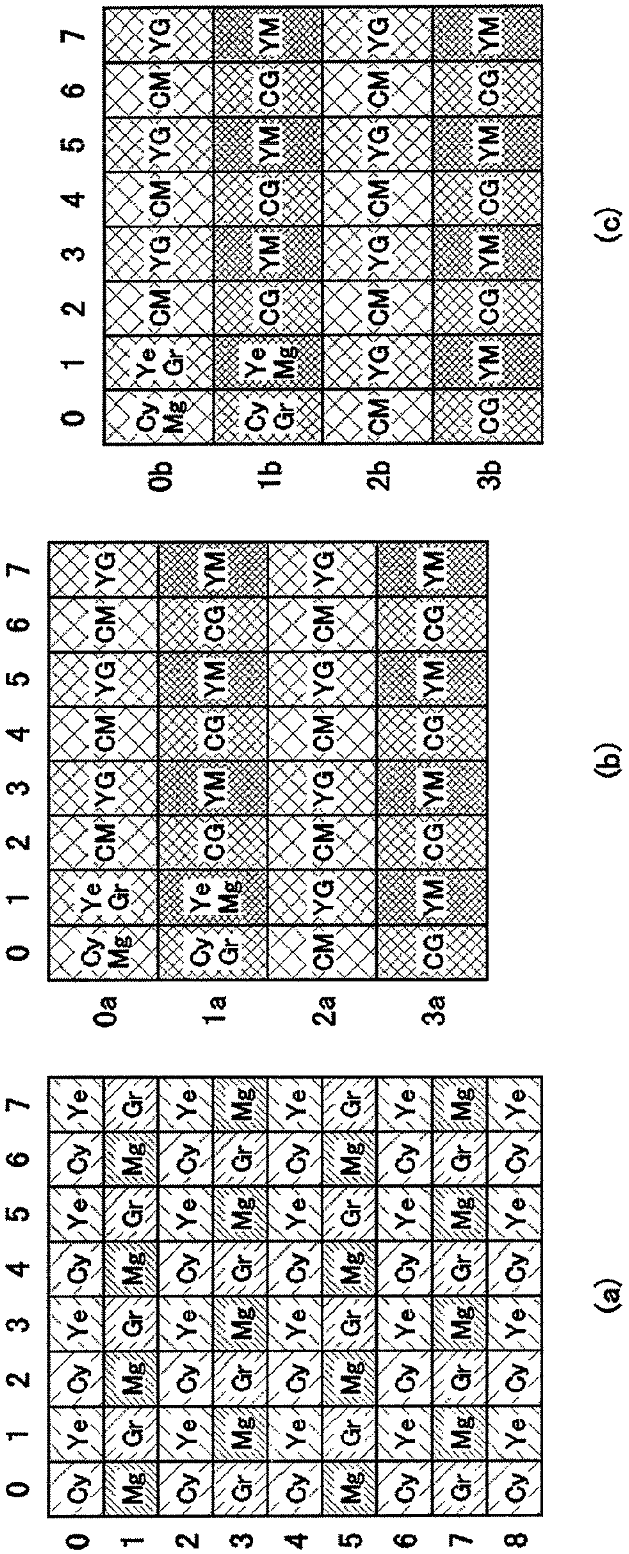
[FIG. 3(*a*) to FIG. 3(*c*)] FIG. 3(*a*) is a diagram illustrating an example of data strings of a complementary-color-field color-difference sequential system, FIG. 3(*b*) is a diagram illustrating an example of a field A of interlaced scanning, and FIG. 3(*c*) is a diagram illustrating an example of a field B of the interlaced scanning.

FIG. 3(*a*) is a diagram illustrating an example of data strings of the complementary-color-field color-difference sequential system, FIG. 3(*b*) is a diagram illustrating a field A of interlaced scanning, and FIG. 3(*b*) is a diagram illustrating a field B of the interlaced scanning. In FIG. 3(*a*) to FIG. 3(*c*), color data is described as follows. "CM" or "CyMg" represents the combination of. Cyan and Magenta. "YG" or "YeGr" represents the combination of Yellow and Green.

"CG" or "CyGr" represents the combination of Cyan and Green. "YM" or "YeMg" represents the combination of Yellow and Magenta.

Using the columns of pixels illustrated in FIG. 3(*b*), consideration is given to subtraction processing with respect to the neighboring pixels. In FIG. 3(*b*), "CM" is arranged at the 0a-th column of the zero-th row, and "YG" is arranged at the 0a-th column of the first row. As described above, "CM" represents the combination of Cyan and Magenta. "YG" represents the combination of Yellow and Green. Moreover, Cyan consists of Blue (B) and Green (G). Magenta consists of Red (R) and Blue (B). Yellow (Y) consists of Green (G) and Red (R). Accordingly, when "YG" arranged at the 0a-th column of the first row on the left side is subtracted from "CM" arranged at the 0a-th column of the zero-th row, the following relational expression is established.

$$CM-YG=B+G+R+B-(G+R+G)=2B-G$$

Similarly, in FIG. 3(*b*), "CG" is arranged at the 1a-th column of the zero-th row, and "YM" is arranged at the 1a-th column of the first row. As described above, "CG" represents the combination of Cyan and Green. "YM" represents the combination of Yellow and Magenta. Accordingly, when "CG" arranged at the 1a-th column of the zero-th row on the right side is subtracted from "YM" arranged at the 1a-th column of the first row, the following relational expression is established.

$$YM-CG=G+R+R+B-(B+G+G)=2R-G$$

These relational expressions can also be applied to a relationship between CM arranged at the 0b-th column of the zero-th row and YG arranged at the 0b-th column of the first row in FIG. 3(*c*) and to a relationship between CG arranged at the 1b-th column of the zero-th row and YM arranged at the 1b-th column of the first row in FIG. 3(*c*). In other words, the CMYG lines are the B-G lines, and the YMCG lines are the R-G lines.

Figure 5:
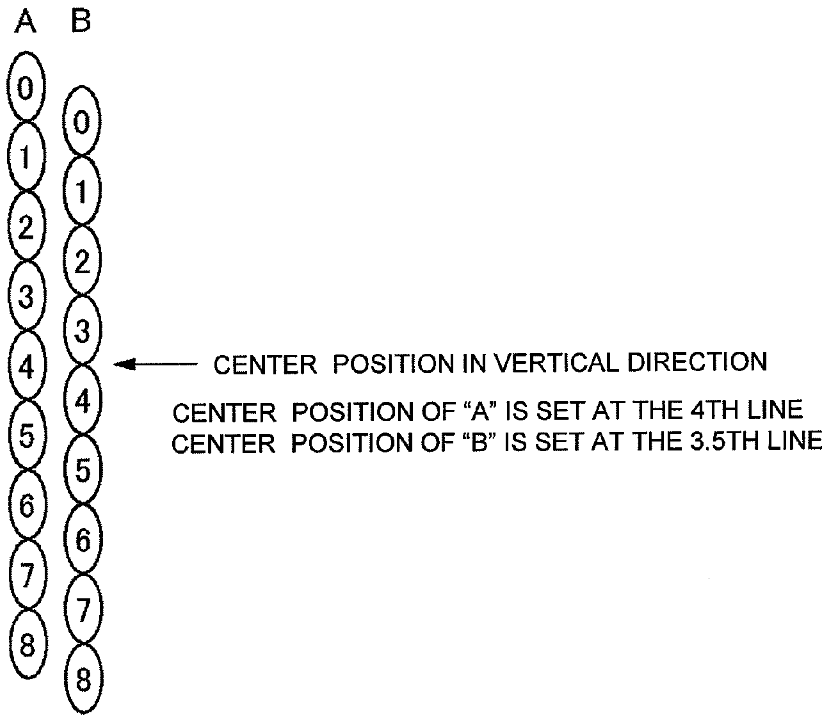
[FIG. 5]

FIG. 4 is the diagram illustrating the correction coordinate points. The address generation unit 24 acquires, based on the distortion information and distances from the position of the optical center, the correction coordinate points P1 to P6 as respective positions on the frame memory 12 corresponding to the positions of respective pixels on a certain line in a screen to be displayed. In FIG. 4, the field 1 is described. Actually, as illustrated in FIG. 3(*b*) and FIG. 3(*c*), the field A (see FIG. 3(*b*)) and the field B (see FIG. 3(*c*)) are deviated from each other by 0.5 line in the vertical direction. The address generation unit 24 can shift the position of the optical center in the vertical direction by 0.5 line according to a field signal (not illustrated) so as to correspond to this line deviation. FIG. 5 is a diagram illustrating a difference in the position of the optical center in the vertical direction between the fields. The position of the optical center in the vertical direction of the field A is set at the fourth line, and the position of the optical center in the vertical direction of the field B is set at the 3.5-th line. In this manner, the positions of the optical centers in the vertical direction of the field A and the field B can be aligned with each other.

Next, processing for generating the complementary-color data of the correction coordinate points P1 to P6 with interpolation processing will be described. Here, the R-G line data of the correction coordinate points P1 to P6 will be calculated as a case example. Since the correction coordinate points P1 to P6 do not necessarily match the positions of the pixels on the frame memory 12, the complementary-color data is calculated by the interpolation of peripheral data to align spatial phases with each other. There are various types of relative positional relationships between correction coordinates and a desired color filter (R-G line here). The interpolation processing must be performed so as not to degrade (deteriorate or add a false signal to) color data and luminance data as much as possible. According to the embodiment, four lines in total, i.e., two lines located above and two lines located below the correction coordinate points are used to perform such interpolation processing.

Note that as for each pixel data after the distortion correction, the data of a desired number of lines (four lines in the embodiment) may be read from the frame memory 12. Alternatively, since coordinates in the vertical direction sequentially change, data to be read from the frame memory 12 per unit time may be reduced with the provision of a buffer on a line-by-line basis, etc.

Here, a method for reducing read data with the provision of a buffer on a line-by-line basis will be described.

In FIG. 4, the coordinates of four lines in the vertical direction, which are necessary for the interpolation processing of the coordinate 1, are Y(2n), Y(2n+1), Y(2n+2), and Y(2n+3). The coordinates of four lines in the vertical direction, which are necessary for the interpolation processing of the coordinate 2, are Y(2n−1), Y(2n), Y(2n+1), and Y(2n+2). The coordinates of four lines in the vertical direction, which are necessary for the interpolation processing of the coordinate 3, are Y(2n−1), Y(2n), Y(2n+1), and Y(2n+2).

From the viewpoint of line units, a difference between data necessary for the processing of the coordinate 1 and data necessary for the processing of the coordinate 2 is equivalent to the data of the line indicated by the coordinate Y(2n−1) in the vertical direction and to the data of the line indicated by the coordinate Y(2n+3) in the vertical direction. The data of the line indicated by Y(2n+3) is not used for the processing of the coordinate 2 and is thus discarded. Then, the data of the line indicated by Y(2n−1) is newly read from the frame memory 12. Similarly, from the viewpoint of the line units, there is no difference between data necessary for the processing of the coordinate 2 and data necessary for the processing of the coordinate 3. In shifting to the processing of the coordinate 2 from the processing of the coordinate 1, it is only necessary to newly read the data of the line indicated by the coordinate Y(2n−1) in the vertical direction from the frame memory 12. On the other hand, in shifting to the processing of the coordinate 3 from the processing of the coordinate 2, it is not necessary to read data from the frame memory 12 from the viewpoint of the line units.

Figure 6:
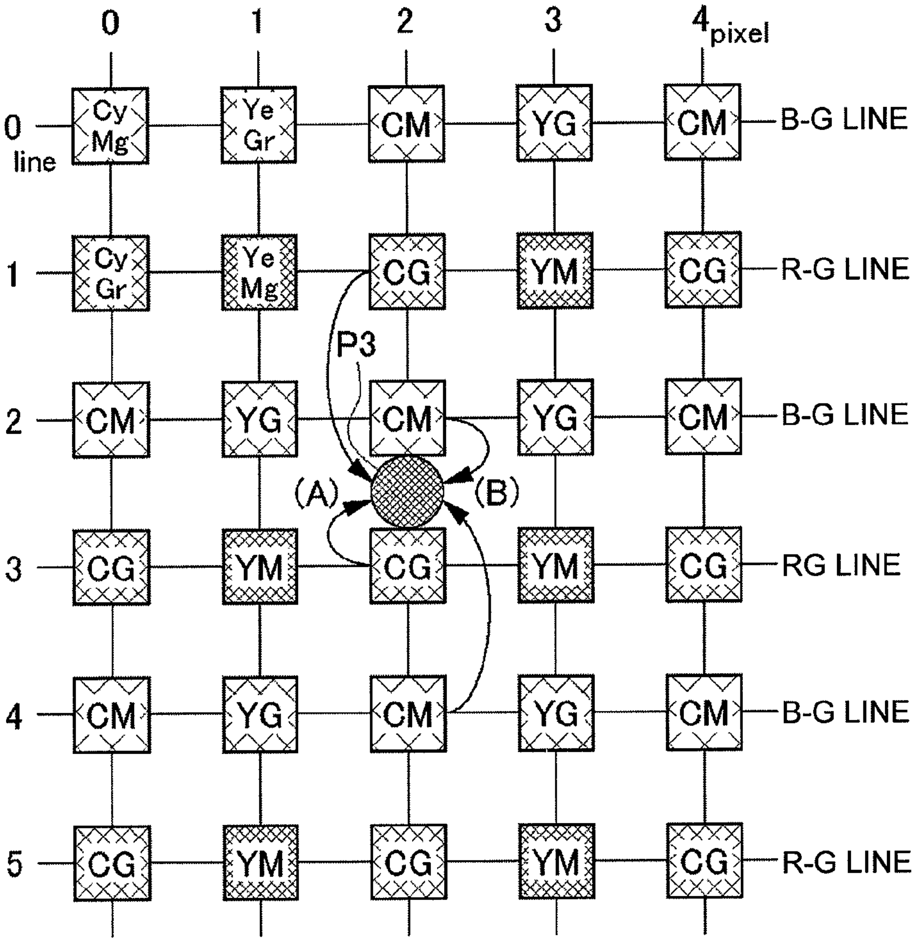
[FIG. 6]

FIG. 6 is a diagram illustrating the correction coordinate point P3 of FIG. 4 in further detail. A consideration is given to a case in which the data of the R-G line of the correction coordinate point P3 (line=2.5, pixel=2) is calculated. For the interpolation of each plane, data is selected from the YMCG line equivalent to the R-G line. It is necessary to calculate CG as the data of the R-G line of the correction coordinate point P3. Thus, data at the first column of the second row and data at the third column of the second row (both are CG) are interpolated.

Here, in a case where color data formed of the same color filter appears only for every two lines and linear interpolation for each color plane is performed at interlaced reading as in the case of the embodiment, the occurrence of loopback at a frequency band and the reduction of vertical resolution due to interpolation calculation are inevitable. Particularly for monitoring cameras whose band is not optically limited in a vertical direction, the degree of such degradation is increased.

Figure 7:
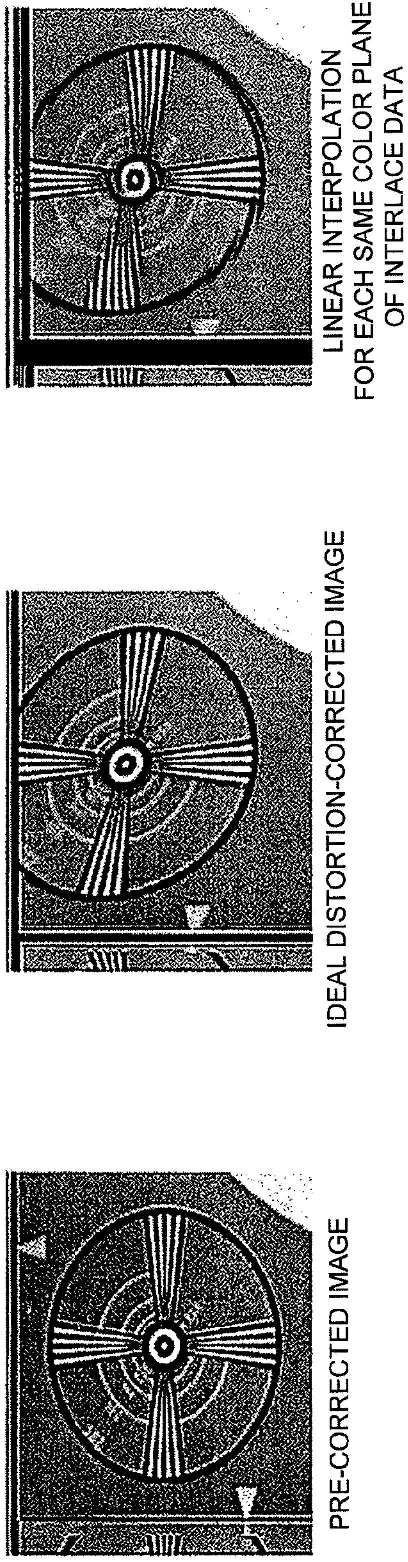
[FIG. 7(*a*) to FIG. 7(*c*)] FIG. 7(*a*) is a diagram illustrating a pre-corrected image, FIG. 7(*b*) is a diagram illustrating an ideal distortion-corrected image, and FIG. 7(*c*) is a diagram illustrating degradation in image quality with interpolation for each color plane of interlace data.

FIG. 7(*a*) is a diagram illustrating a pre-corrected image, FIG. 7(*b*) is a diagram illustrating an ideal distortion-corrected image, and FIG. 7(*c*) is a diagram illustrating a distortion-corrected image with linear interpolation for each same color plane of interlace data. It is clear from FIG. 7(*c*) that image quality is seriously degraded by linear interpolation for each color plane.

Thus, according to the embodiment, complementary-color data is calculated based on the following three components so as not to degrade (deteriorate or add a false signal to) image quality as much as possible.

1. color data Tgt_H
2. color-data-related luminance data (first luminance data) yl_compre
3. luminance-based data (second luminance data) YLc First, the component "1. color data Tgt_H" will be described. According to the embodiment, the correction is performed as described above using four lines in total, i.e., two lines located above and two lines located below a correction coordinate point. The color-data selection unit 26 selects the data of two lines having the same color-difference line as that of an object to be calculated (R-G line here) from four lines read from the frame memory 12.

In the case of the example illustrated in FIG. 6, the data of the four lines, i.e., the first line, the second line, the third line, and the fourth line in the vertical direction is read from the frame memory 12. When the data of the R-G line is to be calculated, the color-data selection unit 26 selects the data of the first line and the data of the third line as indicated by (A) in FIG. 6. Note that when the data of the B-G line is to be calculated, the color-data selection unit 26 selects the data of the second line and the data of the fourth line as indicated by (B) in FIG. 6.

The color-data generation unit 28 weights the selected data of the two lines to perform the interpolation processing based on the position of the correction coordinate point. In the example illustrated in FIG. 6, the correction coordinate point does not overlap the lines. Thus, the value of the coordinate of the correction coordinate point consists of an integer unit and a decimal unit. In FIG. 6, when the coordinate in the vertical direction is 2.5, the distance of the coordinate from the first line is 1.5 and the distance of the coordinate from the third line is 0.5. The complement of the sum of the distances may be used as a weighting factor. The weighting factor will be described below.

$$\text{The weight of the first line: } (1.5+0.5)-1.5=0.5$$

$$\text{The weight of the third line: } (1.5+0.5)-0.5=1.5$$

According to the embodiment, linear interpolation is performed as a method for calculating the interpolation of color data.

Note that it is necessary to use data having a distant spatial phase to perform the interpolation of color data. More specifically, in order to calculate the data of the R-G line of a coordinate P, it is necessary to use the data of the first line far from the neighboring second line.

Next, the component "2. color-data-related luminance data: yl_compre" will be described. Note that for the interpolation of color-related luminance data as well, it is necessary to use data having a distant spatial phase as in the case of color data. According to the embodiment, four lines in total, i.e., two lines located above and two lines located below a correction coordinate point are used as described above. The luminance-data generation unit 30 generates luminance data for each line from the data of the four lines. The color-data-related luminance-data selection unit 32 selects the data of two lines having the same color-difference line as that of an object to be calculated (R-G line here) from the generated luminance data of the four lines. The color-data-related luminance-data generation unit 34 weights the selected data of the two lines to perform the interpolation processing based on the position of the correction coordinate point. The correction coordinate point consists of an integer unit and a decimal unit, but the color-data-related luminance-data generation unit 34 may perform weighting in the same manner as the color-data generation unit 28.

Figure 8:
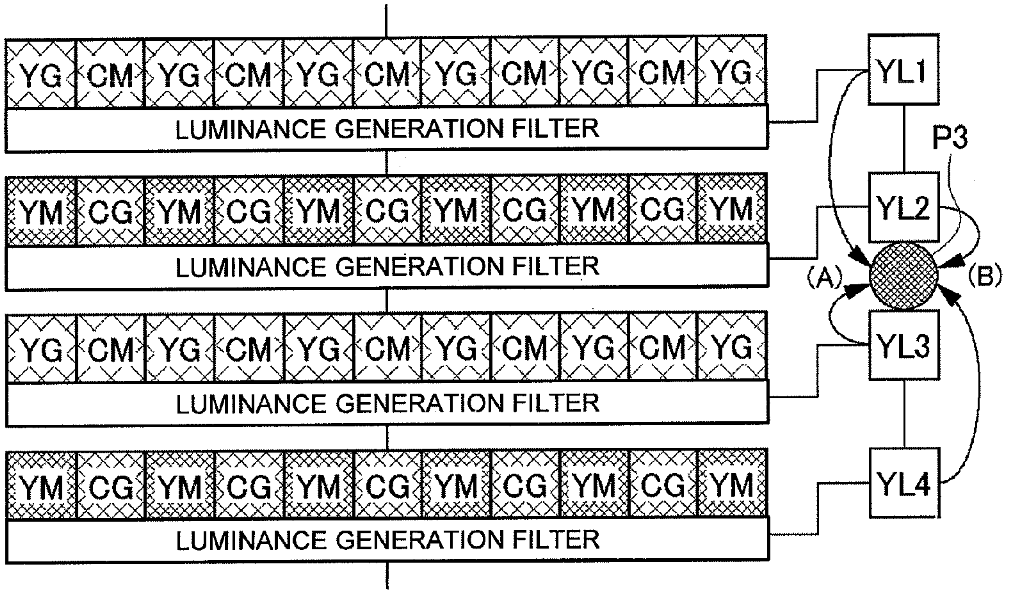
[FIG. 8]

FIG. 8 is a diagram illustrating an overview of the generation of luminance for four lines by the luminance-data generation unit 30, the selection of two lines by the color-data-related luminance-data selection unit 32, and the interpolation processing of luminance data from the two lines by the color-data-related luminance-data generation unit 34.

In image data of the complementary-color-field color-difference sequential system, a DC component constitutes luminance. Accordingly, the luminance-data generation unit 30 can obtain luminance data by the application of a low pass filter (LPF). According to the embodiment, a finite impulse response (FIR) LPF having odd-numbered taps is used because of its adaptability to digital signal processing and in-frame processing, capability of constituting a linear phase filter, etc.

In generating luminance data with the FIRLPF, it is necessary to consider the following items.

(1) Frame memory band and the number of taps
(2) Attenuation amount
(3) Pass band width In general, a known digital filter has a higher degree of freedom in design of a pass band width, an interruption frequency, an attenuation amount, etc., if it has a larger number of taps. In this case, the larger the number of the taps, the more the amount of data to be read from the frame memory 12 per unit time increases. In order to broaden a frame memory band, an increase in reading speed, the expansion of a data bus, etc., are required. Since both of a speed and a bus width may become factors leading to an increase in cost, it is necessary for them to be balanced with the conditions indicated in the items (2) and (3).

In generating color-data-related luminance data, it is necessary to substantially attenuate color data (color carrier component) existing as a high frequency component. If the color carrier component remains, color data calculated in subsequent luminance-color-signal generation (S16) may be degraded.

Figure 9:
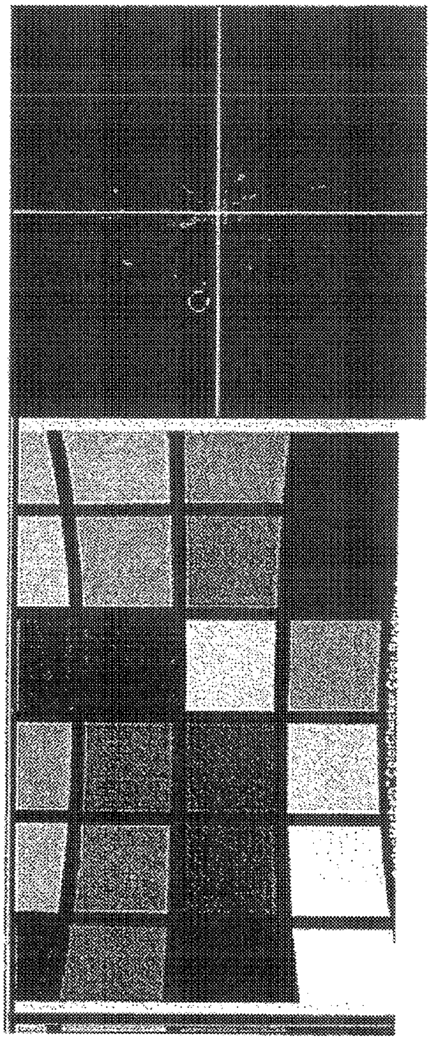
Figure 9:
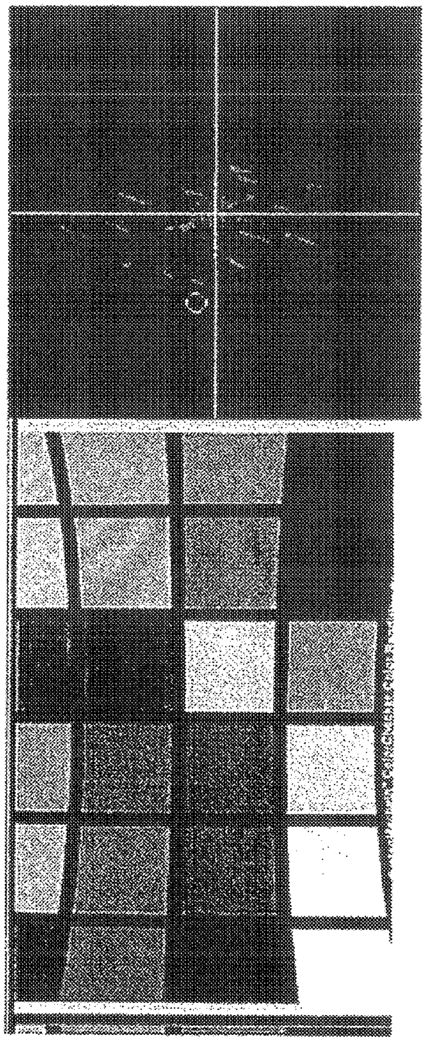

FIG. 9(*a*) is a diagram illustrating an example of an image having an appropriate color component where a color carrier has an attenuation of 65 dB, and FIG. 9(*b*) is a diagram illustrating an example of a degraded image where a color carrier has an attenuation of 14 dB. In a case where the attenuation amount of a color carrier component is insufficient for the generation of luminance data, color data having been subjected to luminance-color-signal processing may tend to expand in an Mg-Gr direction on a vector scope as illustrated in the right side of FIG. 9(*b*). The attenuation amount of a color carrier component must be set so as not to prevent such a phenomenon to occur after the luminance-color-signal processing.

Figure 10:
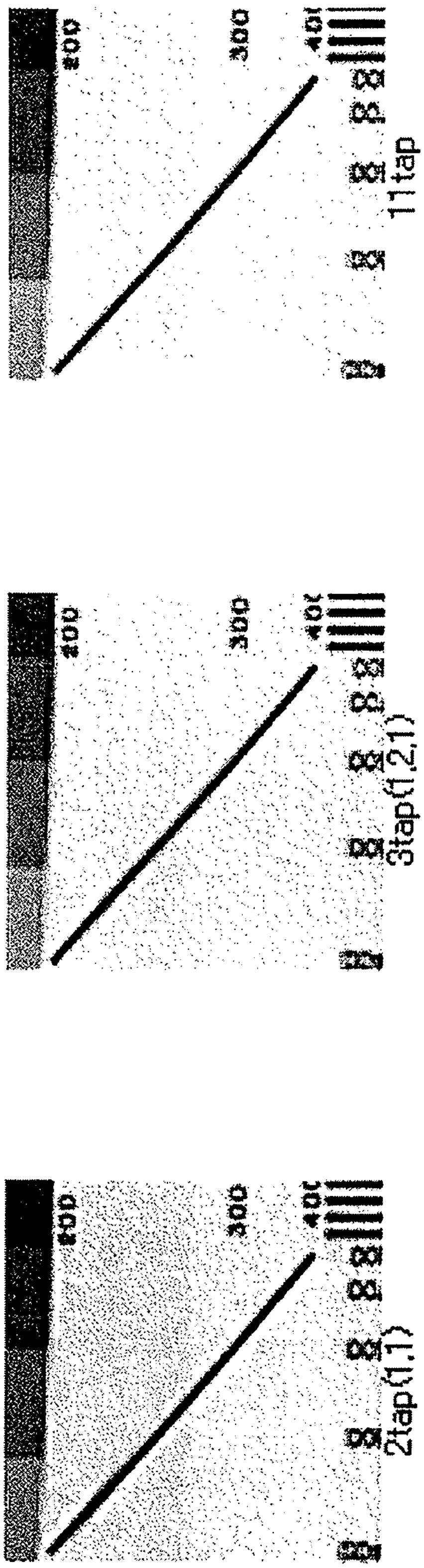
[FIG. 10 (*a*) to FIG. 10(*c*)] FIG. 10(*a*) is a diagram illustrating a luminance-data generation filter and an image having been subjected to luminance-color-signal processing, FIG. 10(*b*) is a diagram illustrating a luminance-data generation filter and an image having been subjected to the luminance-color-signal processing, and FIG. 10(*c*) is a diagram illustrating a luminance-data generation filter and an image having been subjected to the luminance-color-signal processing.

FIG. 10(*a*) is a diagram illustrating an example of an image obtained when two taps (1, 1) are used for the generation of luminance data, and FIG. 10(*b*) is a diagram illustrating an example of an image obtained when three taps (1, 2, 1) are used for the generation of luminance data. The two taps (1, 1) and the three taps (1, 2, 1) cause no problem in the attenuation amount of a color carrier. However, the two taps (1, 1) cause degradation in image quality (an oblique line is locally thickened) since a spatial phase with color data is deviated. With the three taps (1, 2, 1), a spatial phase with color data is aligned. However, an oblique line is totally thickened since a path frequency band width is relatively narrow. It is preferable to provide a LPF having a wide pass band to avoid degradation in image quality as much as possible. According to the embodiment, an 11-tap FIRLPF is provided in the luminance-data generation unit 30 from the viewpoint of a trade-off between a frame memory band and filter performance. FIG. 10(*c*) is a diagram illustrating an example of an image obtained when the 11-tap FIRLPF is used for the generation of luminance data.

As illustrated in FIG. 8, color-data-related luminance data is generated by interpolation using the luminance data of lines, in which the data of a complementary-color filter having the same color line as that of an object to be calculated exists, with reference to the upper and lower color lines of the same column. The color-data-related luminance data is used so as to be replaced with luminance-based data (having a close spatial phase) described below.

Next, the component "3. luminance-based data YLc" will be described. Luminance-based data can be generated using the data of neighboring pixels and thus has a close spatial phase. The luminance-based-data generation unit 36 generates luminance-based data using four lines in total, i.e., two lines located above and two lines located below a vertical coordinate to be processed. According to the embodiment, BiCubic interpolation is used.

Figure 11:
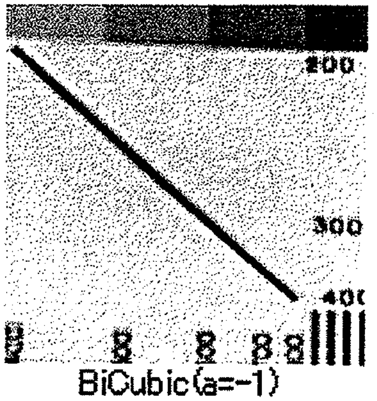
[FIG. 11(*a*) to FIG. 11(*d*)] FIG. 11(*a*) is a diagram illustrating a luminance-data vertical interpolation filter and an image having been subjected to the luminance-color-signal processing, FIG. 11(*b*) is a diagram illustrating a luminance-data vertical interpolation filter and an image having been subjected to the luminance-color-signal processing, FIG. 11(*c*) is a diagram illustrating a luminance-data vertical interpolation filter and an image having been subjected to the luminance-color-signal processing, and FIG. 11(*d*) is a diagram illustrating a luminance-data vertical interpolation filter and an image having been subjected to the luminance-color-signal processing.
Figure 11:
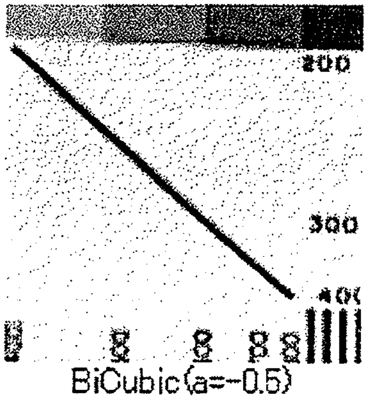
Figure 11:
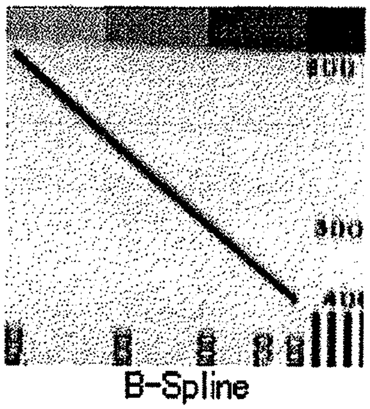
Figure 11:
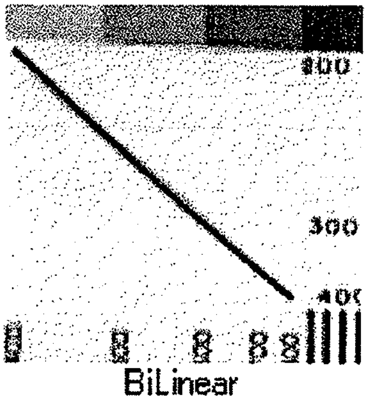
Figure 12:
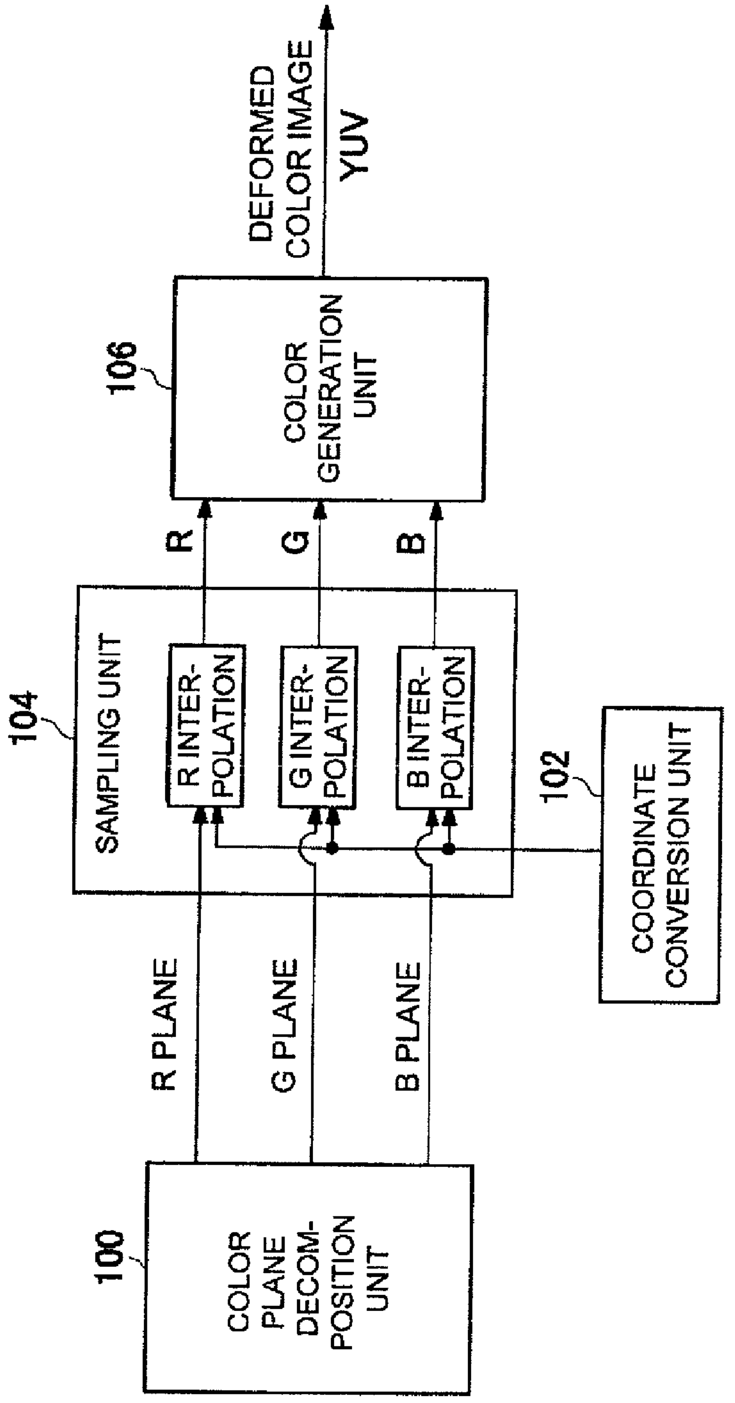
[FIG. 12]

FIG. 11(*a*) to FIG. 11(*d*) are diagrams illustrating differences between image data having been subjected to luminance-color-signal processing with vertical interpolation methods. With BiLinear interpolation, there is a change in the thickness of an oblique line. With B-Spline interpolation, there is almost no change in the thickness of an oblique line, but a signal is totally seriously degraded for calculation performed before the luminance color processing. With the BiCubic interpolation, there are some changes in the thickness of an oblique line and degradation in waveform, but a satisfactory processing result is obtained on the whole.

Here, interpolation expressions according to B-Spline interpolation and BiCubic interpolation will be indicated below.

B-Spline interpolation:

$$(3*t*t*t-6*t*t+4)/6\text{: }(0<=t<1)$$

$$-(t-2)*(t-2)*(t-2)/6\text{: }(1<=t<2)$$

t: distance between correction coordinate point and pixel used for calculating interpolation BiCubic interpolation:

$$(a+2)*t*t*t-(a+3)*t*t+1\text{: }(0<=t<1)$$

$$a*t*t*t-5*a*t*t+8*a*t-4*a\text{: }(1<=t<2)$$

t: distance between correction coordinate point and pixel used for calculating interpolation FIG. 11(*a*) and FIG. 11(*b*) illustrate processing results obtained when the coefficients of the BiCubic interpolation expression are −1 (a=−1) and −0.5 (a=−0.5). When the coefficient is −1 (a=−1), a processing result with a satisfactory resolution feeling is obtained. When the coefficient is −0.5 (a=−0.5), a processing result with a relatively less change in the thickness of the oblique line is obtained.

With the three data described above, the complementary-color-data generation unit 38 replaces spatially-distant color-data-related luminance data with spatially-close luminance-based data to calculate desired data of a complementary-color filter out. An expression for calculating data is indicated below.

$$\text{out}=YLc+(Tgt\_H-yl\_\text{compre})$$

With the processing described in detail above, data of the complementary-color-field color-difference sequential system can be obtained in which distortion in the vertical direction is corrected.

Referring back to FIG. 2, a description will be given below. The image signal processing apparatus 1 processes the obtained data of the complementary-color-field color-difference sequential system with the luminance-color-signal generation unit 18 to obtain luminance data and color data (S16). Then, the image signal processing apparatus applies second distortion correction processing (hereinafter referred to as "second correction processing") to the generated luminance-color signal (S18). The second correction processing refers to processing in which distortion in the horizontal direction is corrected. Since a memory necessary for correcting distortion in the horizontal direction is of a line-by-line basis arrangement, it has a high degree of freedom in a unit to which the second correction processing is applied. Note that distortion amounts may be defined in the same manner as the processing in the vertical direction (S14). Since the luminance-color signal has been generated and no special sampling such as interlaced sampling is performed, interpolation calculation as for the horizontal direction is simply performed according to distortion amounts. As a result, a relatively satisfactory processing result can be obtained. Finally, the image signal processing apparatus 1 applies post-processing to the luminance-color signal having been subjected to the second correction processing (S20). The configurations and the operations of the image signal processing apparatus 1 according to the embodiment are described above.

Compared with conventional image signal processing apparatuses, the image signal processing apparatus 1 according to the embodiment calculates, when correcting distortion in the vertical direction of an image signal of the complementary-color-field color-difference sequential system, complementary-color data by using color data having a distant spatial phase, color-data-related luminance data, and luminance-based data having a close spatial phase with respect to the signal of the complementary-color-field color-difference sequential system. With luminance data having a close spatial phase and color data having a distant spatial phase of the same color filter, a color image signal of the complementary-color-field color-difference sequential system with satisfactory image quality is obtained. As for the horizontal direction, interpolation calculation can be performed in which distortion is corrected after the generation of luminance.

The image signal processing apparatus and the image signal processing method according to the present invention are described in detail above with the presentation of the embodiment, but the present invention is not limited to the embodiment described above.

The functions of the image signal processing apparatus 1 can be recorded as a program in a recording medium such as a magnetic disc, a magnet-optical disc, and a ROM. Accordingly, the functions of the image signal processing apparatus 1 can be implemented when the recording medium is read by a computer and the program is executed by a MPU, a DSP, etc.

According to the embodiment described above, the first correction processing (distortion correction processing in the vertical direction) is described taking as an example an input with the complementary-color-field color-difference sequential system and an output with the complementary-color-field color-difference sequential system. This is because the excellent functions and effects implemented by this case are made clear in such a manner as to clarify the breaks of the processing steps and the description using the configurations that enhance the separability of the function blocks. The final stage of the first correction processing may be set at the forward end of the luminance-color-signal generation unit 18. Further, if such integration is performed in the luminance-color-signal processing, luminance data may be used as it is and color data may be separately input to a color-difference generation unit.

The preferred embodiment of the present invention conceived at this time is described above. However, it is understood that various modifications can be made to the embodiment and intended that all the modifications within the true sprit and the scope of the present invention are included in the attached claims.

INDUSTRIAL APPLICABILITY

As described above, an image signal processing apparatus according to the present invention uses, when correcting distortion in the vertical direction of a signal image of the complementary-color-field color-difference sequential system, color data having a distant spatial phase, color-data-related luminance data, and luminance-based data having a close spatial phase with respect to the signal of the complementary-color-field color-difference sequential system. As a result, the color image signal of the complementary-color-field color-difference sequential system with satisfactory image quality can be obtained. For this reason, the image signal processing apparatus is effectively used as a distortion correction processing apparatus or the like of a monitoring camera, etc.

REFERENCE SIGNS LIST

1 image signal processing apparatus
10 pre-processing unit
12 frame memory
16 first distortion correction processing unit
18 luminance-color-signal generation unit
20 second distortion correction processing unit
22 post-processing unit
24 address generation unit
26 color-data selection unit
28 color-data generation unit
30 luminance-data generation unit
32 color-data-related luminance-data selection unit
34 color-data-related luminance-data generation unit
36 luminance-based-data generation unit
38 complementary-color-data generation unit
100 color plane decomposition unit
102 coordinate conversion unit
104 sampling unit
106 color generation unit

The invention claimed is:

1. An image signal processing apparatus comprising:

a frame memory that stores image data of a complementary-color-field color-difference sequential system;

an address generator, that generates, based on previously-provided distortion information, an address indicating a respective position on the frame memory corresponding to a position of each pixel in a screen to be displayed;

a color-data generator, that generates color data of a point specified by the address by interpolating other color data of pixels, the pixels being in a same column included in a predetermined number of lines located above and below the point and having a same color line as a color line to be generated by interpolation;

a color-data-related luminance-data generator, that generates first luminance data of the point specified by the address by interpolating luminance data of the pixels, the pixels being in the same column included in the predetermined number of lines located above and below the point and having the same color line as the color line to be generated by the interpolation;

a luminance-based-data generator, that generates second luminance data of the point specified by the address by interpolating the luminance data of the pixels, the pixels being in the same column included in the predetermined number of lines located above and below the point; and a complementary-color-data generator, that generates complementary-color data of the point specified by the address based on the color data, the first luminance data, and the second luminance data, the address generator, the color-data generator, the color-data-related luminance data generator, the luminance based data generator and the complementary color data generator being implemented by a processor.

2. The image signal processing apparatus according to claim 1, further comprising:

a luminance-color-signal generator that generates a luminance-color signal based on the complementary-color data generated by the complementary-color-data generator; and a correction processor that corrects distortion in a horizontal direction of the luminance-color signal generated by the luminance-color-signal generator.

3. An image signal processing method comprising:

storing image data of a complementary-color-field color-difference sequential system in a frame memory;

generating, based on previously-provided distortion information, an address indicating a respective position on the frame memory corresponding to a position of each pixel in a screen to be displayed;

generating color data of a point specified by the address by interpolating other color data of pixels, the pixels being in a same column included in a predetermined number of lines located above and below the point and having a same color line as a color line to be generated by interpolation;

generating first luminance data of the point specified by the address by interpolating luminance data of the pixels, the pixels being in the same column included in the predetermined number of lines located above and below the point and having the same color line as the color line to be generated by the interpolation;

generating second luminance data of the point specified by the address by interpolating the luminance data of the pixels, the pixels being in the same column included in the predetermined number of lines located above and below the point; and generating complementary-color data of the point specified by the address based on the color data, the first luminance data, and the second luminance data.

4. A non-transitory computer readable recording medium that stores a program for correcting distortion in image data of a complementary-color-field color-difference sequential system, the program causing a computer to execute:

storing the image data in a frame memory;

generating, based on previously-provided distortion information, an address indicating a respective position on the frame memory corresponding to a position of each pixel in a screen to be displayed;

generating color data of a point specified by the address by interpolating other color data of pixels, the pixels being in a same column included in a predetermined number of lines located above and below the point and having a same color line as a color line to be generated by interpolation;

generating first luminance data of the point specified by the address by interpolating luminance data of the pixels, the pixels being in the same column included in the predetermined number of lines located above and below the point and having the same color line as the color line to be generated by the interpolation;

generating second luminance data of the point specified by the address by interpolating the luminance data of the pixels, the pixels being in the same column included in the predetermined number of lines located above and below the point; and generating complementary-color data of the point specified by the address based on the color data, the first luminance data, and the second luminance data.

5. The image signal processing method according to claim 3, wherein at least of one of the storing, the generating the address, the generating color data, the generating the first luminance data, the generating the second luminance data, and the generating the complementary-color data is performed by a processor.

* * * * *